United States Patent
Yu et al.

(10) Patent No.: US 9,151,663 B2
(45) Date of Patent: Oct. 6, 2015

(54) OPTICAL MODULE INCLUDING PHOTOELECTRIC CONVERSION ELEMENT AND OPTICAL COUPLING MEMBER

(71) Applicant: HITACHI CABLE, LTD., Tokyo (JP)

(72) Inventors: Juhyun Yu, Mito (JP); Hiroki Yasuda, Mito (JP); Kouki Hirano, Hitachinaka (JP); Yoshinori Sunaga, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 296 days.

(21) Appl. No.: 13/748,854

(22) Filed: Jan. 24, 2013

(65) Prior Publication Data

US 2013/0193304 A1 Aug. 1, 2013

(30) Foreign Application Priority Data

Jan. 27, 2012 (JP) .................. 2012-015824

(51) Int. Cl.
*G01J 1/02* (2006.01)
*G02B 6/42* (2006.01)

(52) U.S. Cl.
CPC ............ *G01J 1/0204* (2013.01); *G01J 1/0209* (2013.01); *G02B 6/423* (2013.01); *G02B 6/428* (2013.01); *G02B 6/4214* (2013.01); *G02B 6/4244* (2013.01); *G02B 6/4245* (2013.01); *G02B 6/4265* (2013.01)

(58) Field of Classification Search
CPC .................... G02B 6/4214; H01S 5/02248
See application file for complete search history.

(56) References Cited

U.S. PATENT DOCUMENTS

| | | | |
|---|---|---|---|
| 7,488,122 B2* | 2/2009 | Hashimoto et al. | ............ 385/92 |
| 7,590,315 B2 | 9/2009 | Okubo et al. | |
| 8,902,947 B2* | 12/2014 | Makino et al. | ............ 372/50.1 |
| 2008/0138007 A1 | 6/2008 | Okubo et al. | |
| 2010/0028017 A1 | 2/2010 | Mizoguchi | |

FOREIGN PATENT DOCUMENTS

| | | |
|---|---|---|
| JP | 06-075137 A | 3/1994 |
| JP | 2005-037642 A | 2/2005 |
| JP | 2008-145684 A | 6/2008 |
| JP | 2008-256870 A | 10/2008 |
| JP | 2008-281746 A | 11/2008 |
| JP | 2011-095295 A | 5/2011 |

OTHER PUBLICATIONS

Japanese Office Action dated Feb. 24, 2015 with an English translation thereof.

* cited by examiner

*Primary Examiner* — Tony Ko
(74) *Attorney, Agent, or Firm* — McGinn IP Law Group, PLLC

(57) ABSTRACT

An optical module includes a circuit board including a mount surface and a non-mount surface opposite the mount surface, a photoelectric conversion element mounted on the mount surface of the circuit board, an optical coupling member for holding an optical fiber and optically coupling the optical fiber and the photoelectric conversion element, a semiconductor circuit element mounted on the mount surface of the circuit board, and electrically connected to the photoelectric conversion element, a plate-shaped supporting member arranged so as to sandwich the optical coupling member between the supporting member and the circuit board, and an electrically conductive body supported by the supporting member, extended in a thickness direction of the supporting member, and connected at one end to an electrode provided on the non-mount surface of the circuit board.

7 Claims, 14 Drawing Sheets

COVERLAY 20

20

20

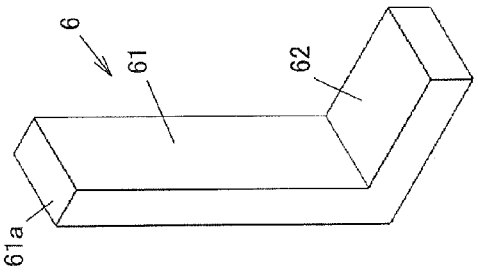
FIG.8A ELECRICALLY CONDUCTIVE BODY 6
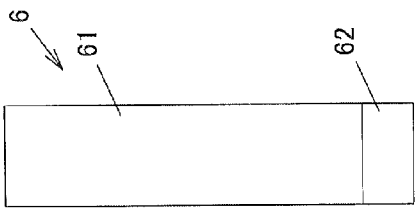
FIG.8D
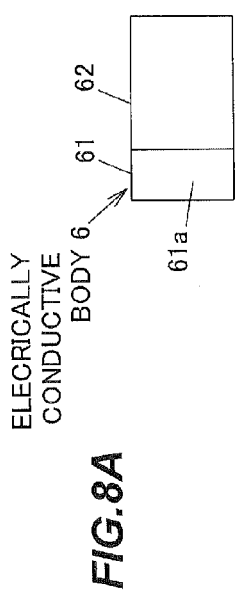
FIG.8B
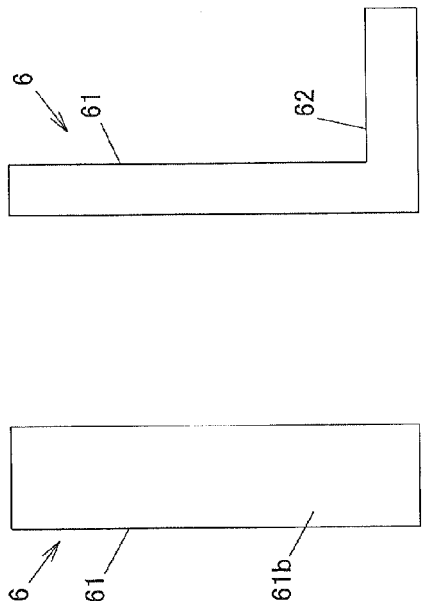
FIG.8C
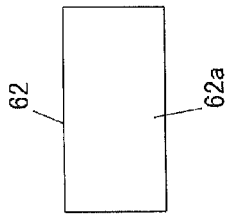
FIG.8E
FIG.8F

OPTICAL MODULE INCLUDING PHOTOELECTRIC CONVERSION ELEMENT AND OPTICAL COUPLING MEMBER

The present application is based on Japanese patent application No. 2012-015824 filed on Jan. 27, 2012, the entire contents of which are incorporated herein by reference.

BACKGROUND OF THE INVENTION

1. Field of the Invention

The present invention relates to an optical module, which transmits a signal through an optical fiber.

2. Description of the Related Art

Conventionally, an optical module for transmitting or receiving a signal through an optical fiber which is equipped with a photoelectric (optical to electric or electric to optical) conversion element for converting electrical energy into optical energy, or optical energy into electrical energy has been known as disclosed by e.g. Japanese Patent Laid-Open No. 2011-95295 (JP-A-2011-95295).

The optical module disclosed by JP-A-2011-95295 includes plate-shaped first to fourth substrates, an IC substrate, and a connector for electrically connecting the optical module to another circuit device. The first substrate is mounted with a light emitting element or a light receiving element thereon. The IC substrate is provided with a circuit which transmits an electrical signal to the light emitting element, or a circuit that amplifies an electric signal of the light receiving element. The second substrate is provided with an insertion guide groove therein for an optical fiber to be inserted thereinto, so that the optical fiber inserted in the insertion guide groove is sandwiched between the second substrate and the third substrate. The IC substrate is installed in an extension direction of the optical fiber, so as to sandwich the first substrate between the IC substrate and the third substrate. That is, the third substrate, the first substrate, and the IC substrate are arranged in this order in the extension direction of the optical fiber. In addition, the first substrate, the third substrate, and the IC substrate are installed on an upper surface of a fourth substrate larger than each of these substrates and the connector is attached to a lower surface of the fourth substrate.

SUMMARY OF THE INVENTION

In recent years, with widespread use of optical communications, the optical module has been being mounted on various devices. Size and weight reduction of the optical module may then be strongly desired depending on the devices. One example of applications of the optical module is communications between an operating portion (keyboard mounted portion) and a displaying portion (display mounted portion) of a folding or sliding mobile phone.

In the optical module disclosed by JP-A-2011-95295 above, the first substrate and the third substrate are installed on the upper surface of the fourth substrate, and further the second substrate is installed on the third substrate. The optical module therefore has such a structure that the three substrates are stacked on the connector. This leads to an increase in the dimension in the thickness direction of the optical module.

Also, a way to shorten the entire length of the above described optical module (the length in the extension direction of the optical fiber) is considered to be, e.g., to miniaturize the second substrate and the third substrate and shorten the insertion guide groove. However, shortening the insertion guide groove leads to the optical fiber holding rigidity lowering, and the optical fiber tending to slip out from the insertion guide groove. This is a structural constraint on shortening the entire length of the optical module.

Accordingly, it is an object of the present invention to provide an optical module capable of ensuring miniaturization thereof while securely holding an optical fiber.

According to a feature of the invention, an optical module comprises:

a circuit board including a mount surface and a non-mount surface opposite the mount surface;

a photoelectric conversion element mounted on the mount surface of the circuit board;

an optical coupling member for holding an optical fiber, the optical coupling member optically coupling the optical fiber and the photoelectric conversion element;

a semiconductor circuit element mounted on the mount surface of the circuit board, and electrically connected to the photoelectric conversion element;

a plate-shaped supporting member arranged so as to sandwich the optical coupling member between the supporting member and the circuit board; and an electrically conductive body supported by the supporting member, extended in a thickness direction of the supporting member, and connected at one end to an electrode provided on the non-mount surface of the circuit board.

The optical coupling member may include a groove therein which opens into the supporting member to receive a tip of the optical fiber, and the supporting member may sandwich the tip of the optical fiber received in the groove between the supporting member and the optical coupling member.

The electrically conductive body may be at least partially exposed at a side surface of the supporting member.

The electrically conductive body may protrude at one end thereof toward the circuit board, relative to an opposite surface of the supporting member to the optical coupling member.

The electrically conductive body may integrally include a first conductor at least partially exposed at the side surface of the supporting member, and a second conductor provided perpendicular to the first conductor, and a side surface of the second conductor is exposed at a back surface of the supporting member opposite the optical coupling member.

The supporting member may include a recess provided therein to at least partially receive the electrically conductive body.

The optical coupling member may include a holding body for holding the optical fiber, and a light guiding body for guiding light exiting from the optical fiber.

The supporting member may include a pooling portion to pool an adhesive to fix the optical fiber.

(Points of the Invention)

The optical module according to the invention allows ensuring miniaturization thereof while securely holding the optical fiber.

BRIEF DESCRIPTION OF THE DRAWINGS

The preferred embodiments according to the invention will be explained below referring to the drawings, wherein:

FIGS. 8A, 8B, 8C, 8D, 8E and 8F are a top view, a front view, a side view, a back view, a bottom view and a perspective view, respectively, showing an electrically conductive body;

DETAILED DESCRIPTION OF THE PREFERRED EMBODIMENTS

Embodiments

Below is described one configuration example of an optical module in a first embodiment according to the invention, by reference to FIGS. 1 to 11.

Figure 1:
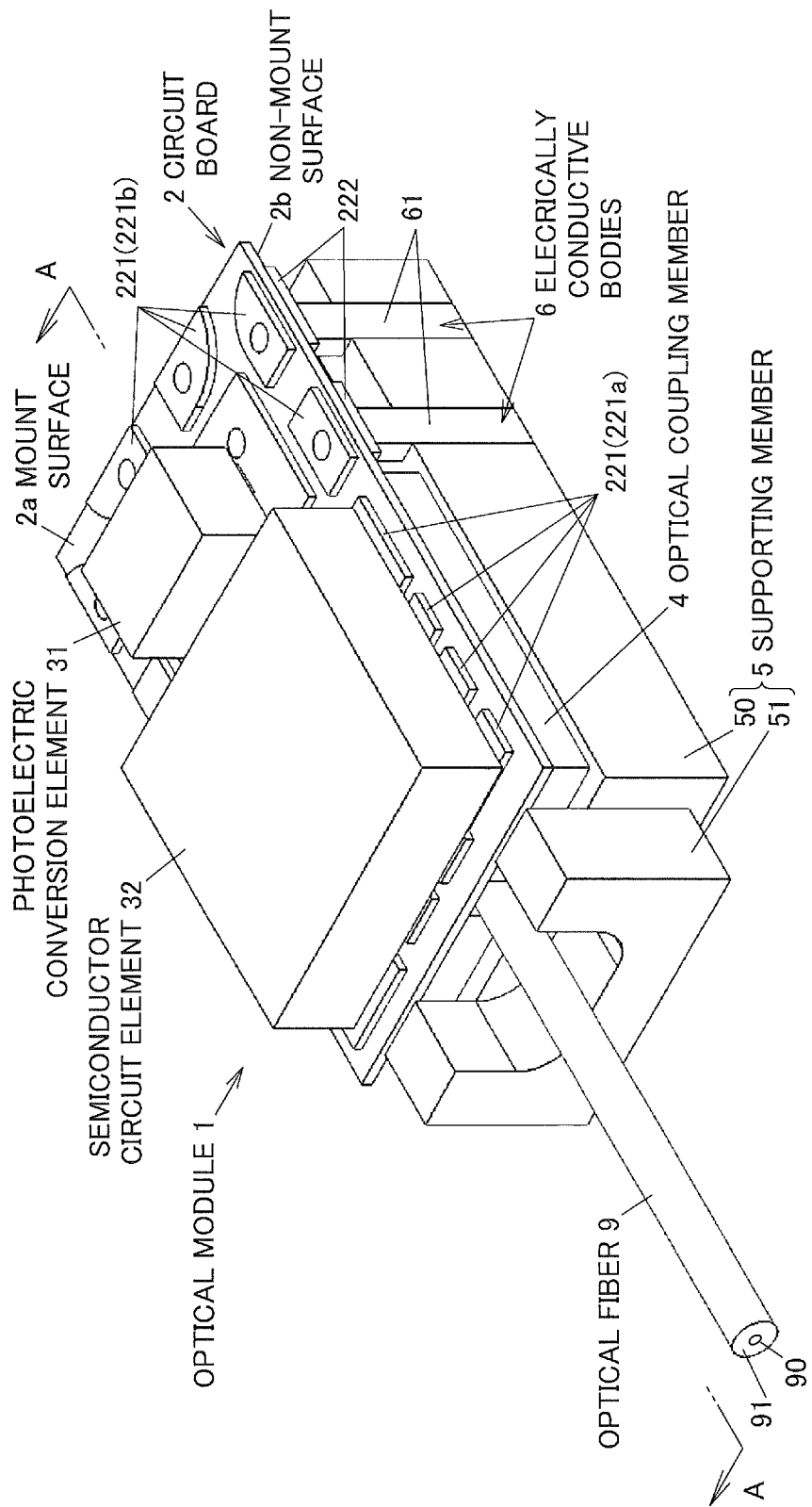
FIG. 1 is a perspective view showing an optical module in a first embodiment according to the invention.
Figure 2:
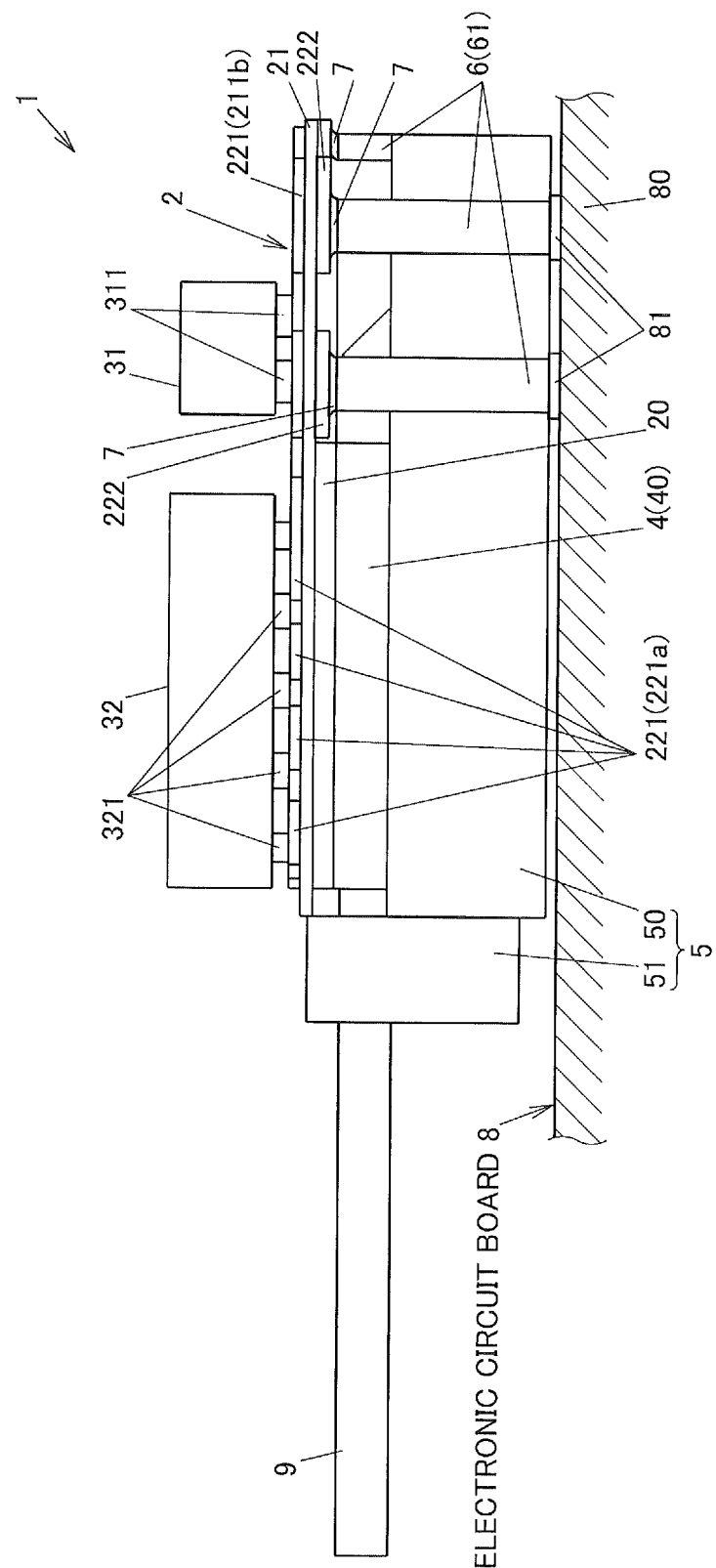
FIG. 2 is a side view showing the optical module mounted on an electronic circuit board.
Figure 3:
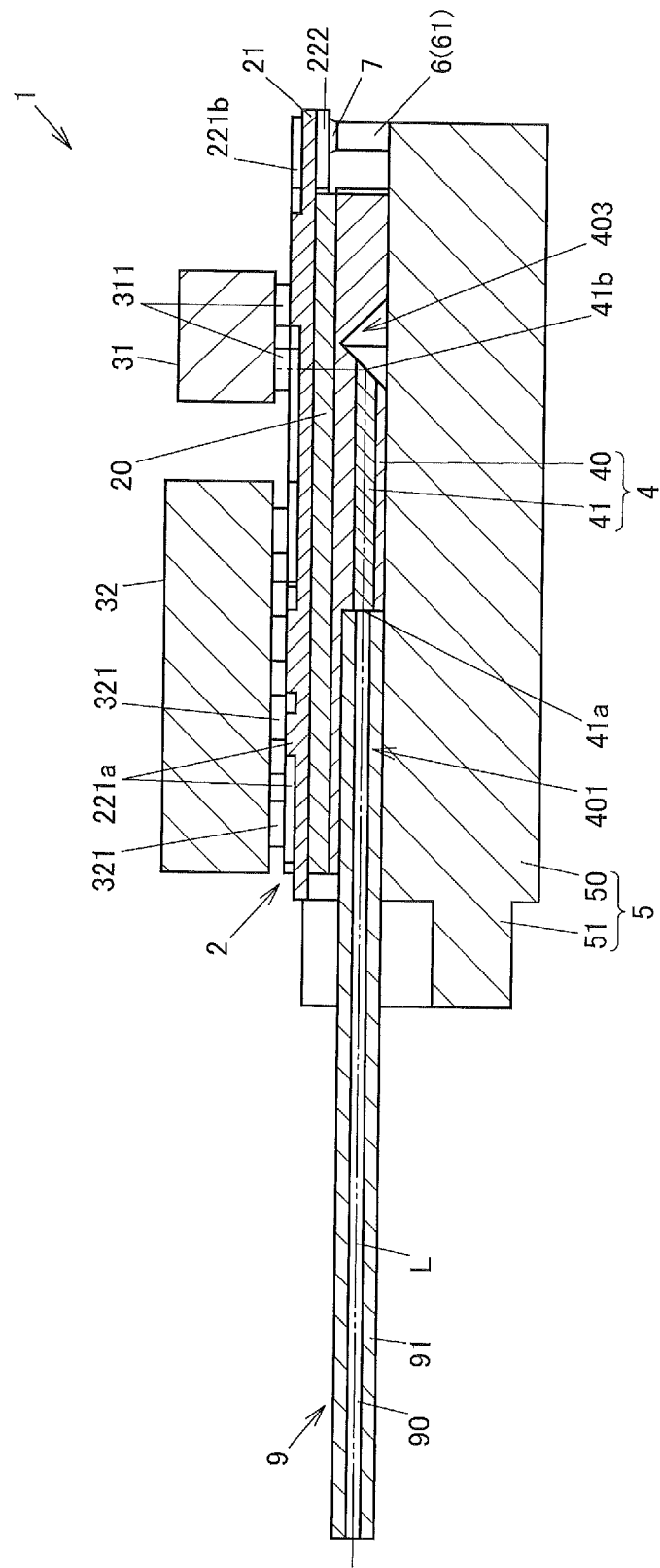
FIG. 3 is a cross sectional view taken along line A-A of FIG. 1.

FIG. 1 is a perspective view showing an optical module 1 in the present embodiment. FIG. 2 is a side view showing the optical module 1 mounted on an electronic circuit board 8. FIG. 3 is a cross sectional view taken along line A-A of FIG. 1 showing the optical module 1 cut along an axis line of an optical fiber 9 mounted to the optical module 1.

As shown in FIG. 2, this optical module 1 is used to be mounted on an electronic circuit board 8. The electronic circuit board 8 is a glass epoxy substrate with a plurality of copper foils 81 stuck to a plate shaped base material 80 resulting from a glass fiber being soaked with an epoxy resin and thermally cured. The electronic circuit board 8 is mounted with electronic components not shown, such as a CPU (Central Processing Unit), a memory element and the like. The optical fiber 9 mounted to the optical module 1 is used for optical communications as a transmission medium, to thereby transmit or receive signals between the electronic circuit board 8 and another electronic circuit board or electronic device.

The optical module 1 includes a circuit board 2, a photoelectric conversion element 31 mounted on a mount surface 2a of the circuit board 2, an optical coupling member 4 for holding the optical fiber 9 while optically coupling the photoelectric conversion element 31 and the optical fiber 9, a semiconductor circuit element 32 mounted on the mount surface 2a of the circuit board 2, and electrically connected to the photoelectric conversion element 31, a plate shaped supporting member 5 arranged so as to sandwich the optical coupling member 4 between the supporting member 5 and the circuit board 2, and electrically conductive bodies 6 supported by the supporting member 5, extended in a thickness direction of the supporting member 5, and connected at one end to electrodes 222, respectively, provided on a non-mount surface 2b of the circuit board 2.

Further, in the present embodiment, on a side equipped with an optical coupling member 4 of the circuit board 2, there is provided a coverlay 20 (as shown in FIGS. 2 and 3) made of an insulating resin. The coverlay 20 and the circuit board 2 are fixed together by a fixing means therebetween, such as an adhesive. Likewise, the coverlay 20 and the optical coupling member 4 are fixed together by the fixing means, and the optical coupling member 4 and the supporting member 5 are fixed together by the fixing means.

The optical module 1 is, e.g. 1.3 mm in entire length in an extension direction of the optical fiber 9, and is, e.g. 1.0 mm in dimension in a width direction orthogonal to this extension direction. In addition, a dimension in a height direction (perpendicular direction to the electronic circuit board 8) of the optical module 1 is, e.g. 0.8 mm.

The photoelectric conversion element 31 is an element that converts electric energy into light or converts light into electric energy. As an example of the former, there is a semiconductor laser element or an LED (Light Emitting Diode). As an example of the latter, there is a photodiode. The photoelectric conversion element 31 is configured so that light enters or exits from a light receiving or emitting portion not shown which is formed on an opposite surface to the circuit board 2.

In the case where the photoelectric conversion element 31 is the element that converts electric energy into light, the semiconductor circuit element 32 is a driver IC for driving the photoelectric conversion element 31 based on an electric signal inputted from the electronic circuit board 8. Further, in the case where the photoelectric conversion element 31 is the element that converts light into electrical energy, the semiconductor circuit element 32 is a preamplifier IC which amplifies a signal input from the photoelectric conversion element 31 and outputs that amplified input signal to the electronic circuit board 8.

Incidentally, although in the present embodiment, it is described that there are one photoelectric conversion element 31 and one semiconductor circuit element 32, a plurality of the photoelectric conversion elements 31 and a plurality of the semiconductor circuit elements 32 may be mounted on the circuit board 2.

Figure 4A:
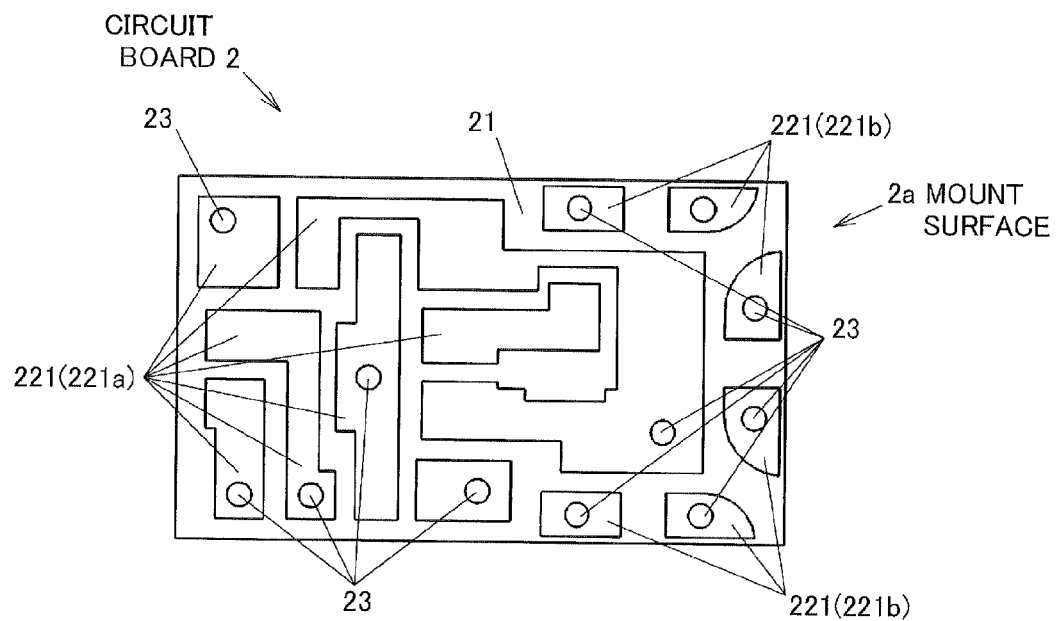
FIG. 4A is a plan view showing a mount surface of a circuit board.
Figure 4B:
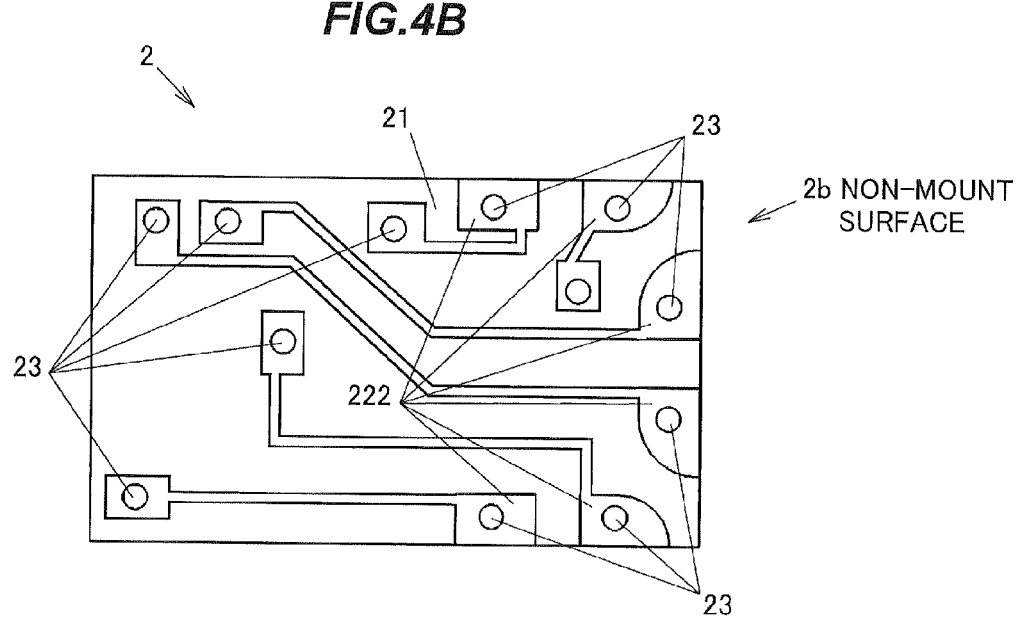
FIG. 4B is a plan view showing of a non-mount surface of the circuit board.

FIG. 4A is a plan view showing the mount surface 2a of the circuit board 2, and FIG. 4B is a plan view showing of the non-mount surface 2b of the circuit board 2.

The circuit board 2 is a flexible substrate with a plurality of electrodes 221 and 222 formed of electrically conductive metal foils provided on surfaces of a base material 21 formed of an insulation film having flexibility and optical transparency. The mount surface 2a mounted with the photoelectric conversion element 31 and the semiconductor circuit element 32 is provided with a plurality of the electrodes 221. The non-mount surface 2b on the back side of the mount surface 2a is provided with a plurality of the electrodes 222.

A plurality (six in this embodiment) of the electrically conductive bodies 6 are soldered to the plurality of the electrodes 222 respectively so that the electrodes 222 and electrically conductive bodies 6 are electrically connected to each other by solder 7 (see FIGS. 2 and 3). The plurality of the electrodes 221 on the mount surface 2a are classified into connecting electrodes 221a and testing electrodes 221b according to functions thereof the connecting electrodes 221a are electrodes that are connected by soldering to a terminal 311 of the photoelectric conversion element 31 or a terminal 321 of the semiconductor circuit element 32 (see FIGS. 2 and 3).

The testing electrodes 221b are electrodes for testing operation of the optical module 1 alone with the optical module 1 not mounted on the electronic circuit board 8, and are connected by through holes 23 directly to the plurality of the electrodes 222, respectively. An operation testing probe is brought into contact with the testing electrodes 221b, to supply power and input or output the test signal via that probe. In the present embodiment, a plurality (six) of the testing electrodes 221b are arranged around the photoelectric conversion element 31 whose mount area is smaller than that of the semiconductor circuit element 32.

Figure 5A:
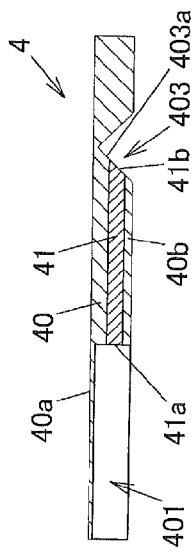
FIG. 5A is a plan view showing an optical coupling member.
Figure 5B:
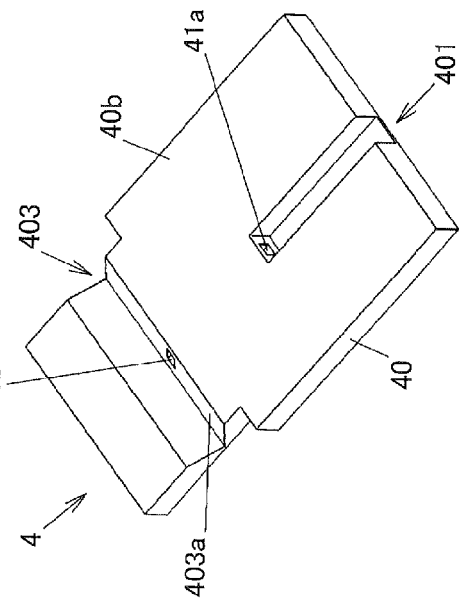
FIG. 5B is a cross sectional view taken along line B-B of FIG. 5A.
Figure 5C:
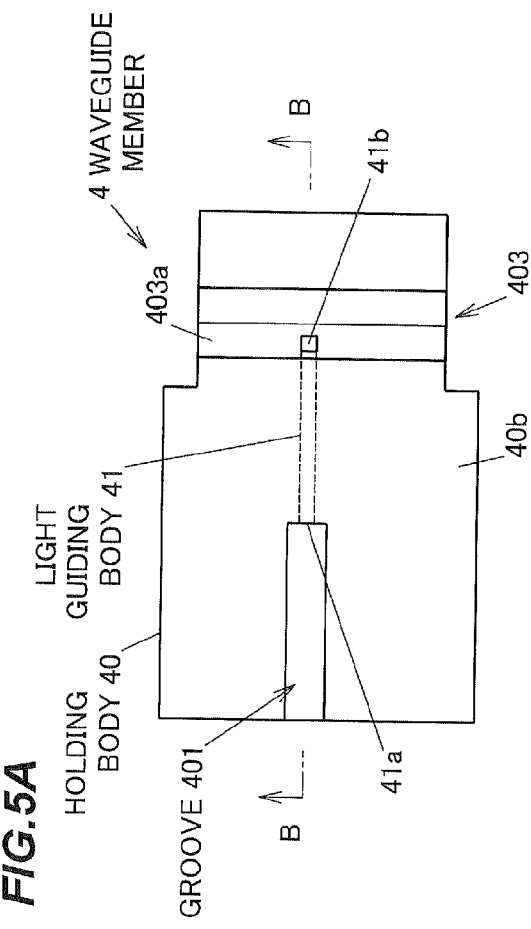
FIGS. 5C and 5D are perspective views, respectively, showing the optical coupling member of FIG. 5A.
Figure 5D:
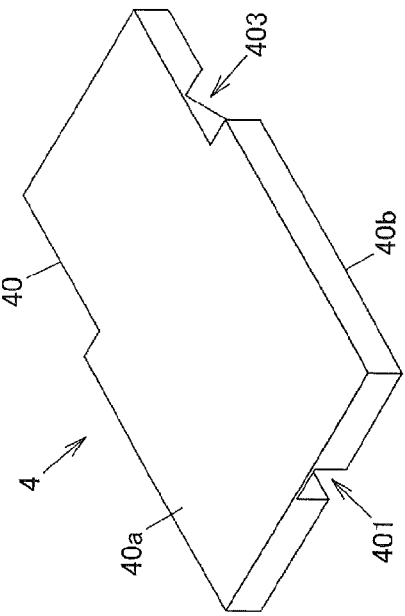

FIG. 5A is a plan view showing the optical coupling member 4, and FIG. 5B is a cross sectional view taken along line B-B of FIG. 5A, and FIGS. 5C and 5D are perspective views, respectively, showing the optical coupling member of FIG. 5A.

The optical coupling member 4 is configured to include a holding body 40 for holding the optical fiber 9, and a light guiding body 41 for guiding light that exits from the optical fiber 9. The holding body 40 and the light guiding body 41 are both translucent at a wavelength of light propagating through the optical fiber 9, and the light guiding body 41 has a refractive index higher than a refractive index of the holding body 40. The holding body 40 is made of, e.g. a PI (polyimide), and the light guiding body 41 is made of e.g. an acryl, epoxy, PI, polysiloxane or the like.

The holding body 40 is shaped into a flat plate, and includes a flat front surface 40a which faces the coverlay 20, and a back surface 40b which is parallel to the front surface 40a and which faces the supporting member 5. The holding body 40 includes a groove 401 in the back surface 40b thereof which opens into the supporting member 5 to receive a tip of the optical fiber 9. The groove 401 is formed in such a manner as to be extended in a direction parallel to the semiconductor circuit element 32 and the photoelectric conversion element 31, and depressed in a thickness direction of the holding body 40 from the back surface 40b of the holding body 40 toward the front surface 40a.

In addition, the holding body 40 includes the light guiding body 41 which communicates with the groove 401, and which guides light propagating through the optical fiber 9. The center axis of the light guiding body 41 is parallel to the extension direction of the groove 401. In FIG. 5A, the light guiding body 41 is indicated by a broken line.

In addition, the holding body 40 is provided with a notch 403 in the back surface 40b. The notch 403 is formed from one side surface of the holding body 40 to the other side surface thereof; and the extension direction thereof is orthogonal to the center axis of the light guiding body 41. Also, the notch 403 has a triangular shape in side view, and the light guiding body 41 is terminated by a notched surface 403a of the notch 403. The angle between the notch 403 and the back surface 40b is 45 degrees, for example. In addition, the notch 403 may be filled with a resin.

One groove 401 side end of the light guiding body 41 is an entry or exit surface 41a, while an oblique surface thereof terminated by the notched surface 403a of the notch 403 is a reflecting surface 41b. The entry or exit surface 41a is provided to be located to face a core 90 surrounded by a cladding layer 91 (as shown in FIG. 1) of the optical fiber 9 held by the groove 401. The reflecting surface 41b reflects light exiting from the photoelectric conversion element 31 toward the entry or exit surface 41a, or light entering from the entry or exit surface 41a toward the photoelectric conversion element 31.

As shown in FIGS. 2 and 3, the tip of the optical fiber 9 received in the groove 401 of the holding body 40 is sandwiched between the holding body 40 (the bottom of the groove 401) and the supporting member 5.

Figure 6A:
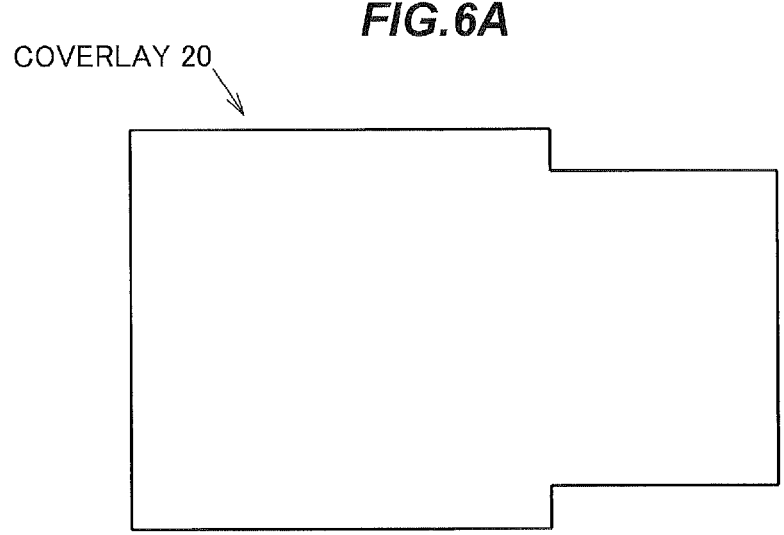
FIGS. 6A, 6B and 6C are a plan view, a side view and a perspective view, respectively, showing a coverlay.
Figure 6B:
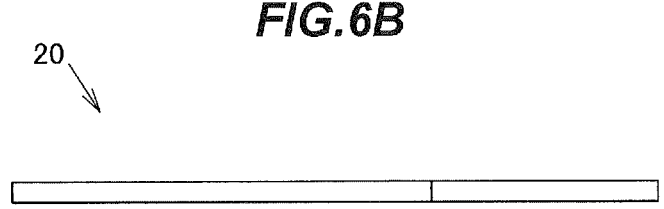
Figure 6C:
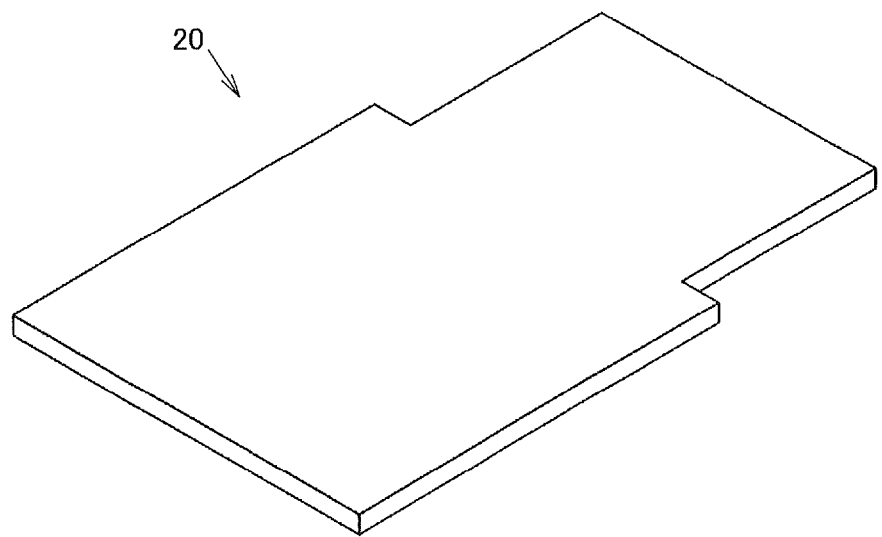

FIGS. 6A, 6B and 6C are a plan view, a side view and a perspective view, respectively, showing the coverlay 20.

The coverlay 20 is a flat plate shaped insulator having optical transparency. The coverlay 20 is made of, e.g. a PI (polyimide). In addition, the coverlay 20 is formed to have a size and shape to cover the entire front surface 40a of the optical coupling member 4 (the holding body 40). In this embodiment, one opposite flat surface of the coverlay 20 to the front surface 40a is congruent with the front surface 40a.

Figure 7A:
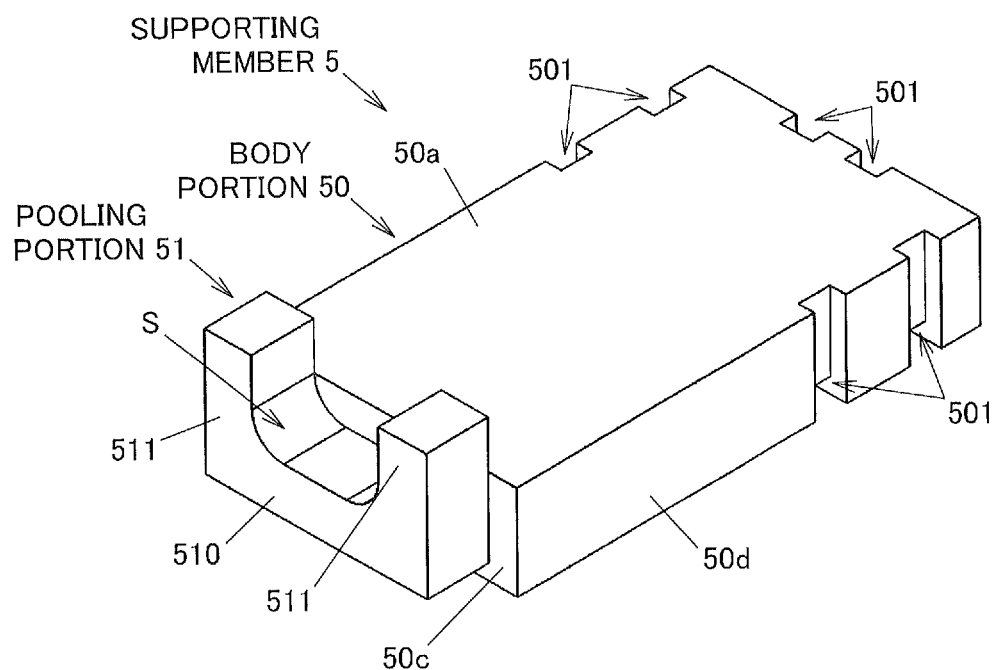
FIGS. 7A and 7B are perspective views, respectively, showing a supporting member.
Figure 7B:
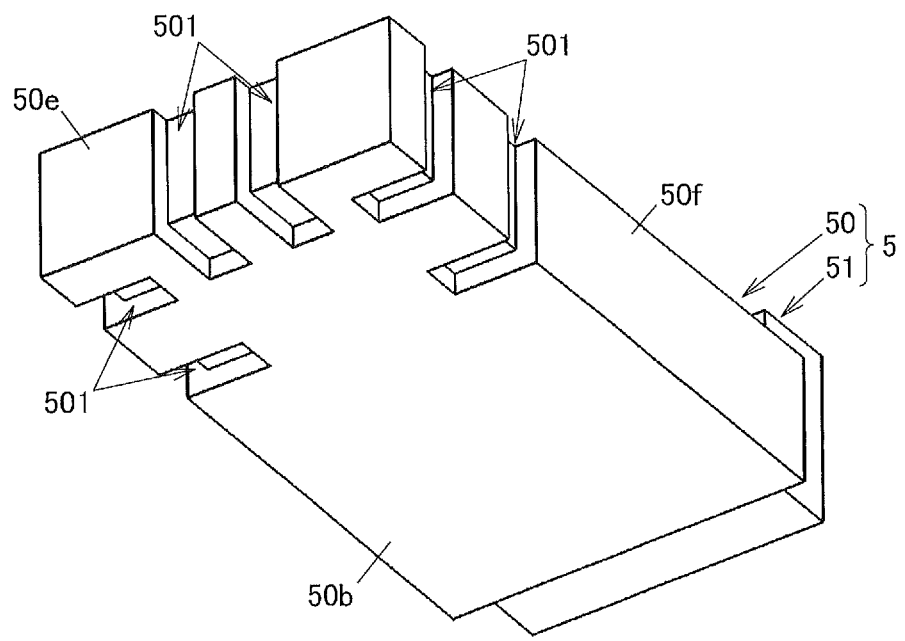

FIGS. 7A and 7B are perspective views, respectively, showing the supporting member 5. The supporting member 5 integrally includes a rectangular parallelepiped body portion 50 made of an insulative resin such as a PI (polyimide) or the like, and a pooling portion 51 to pool an adhesive to fix the optical fiber 9.

The body portion 50 includes a front surface 50a, a back surface 50b, and first to fourth side surfaces 50c to 50f. The areas of the front surface 50a and the back surface 50b are formed to be greater than the areas of the first to fourth side surfaces 50c to 50f.

The three side surfaces (the second to fourth side surfaces 50d to 50f) of the body portion 50 exclusive of the first side surface 50c are provided with a plurality of recesses 501 each which extend in a thickness direction of the body portion 50 (in the front surface 50a to back surface 50b direction). In this embodiment, the second to fourth side surfaces 50d to 50f are provided with the two recesses 501 each. Each recess 501 is formed in an L-shape which is bent at right angles at a back surface 50b side end of the second to fourth side surfaces 50d to 50f; and each recess 501 is partially formed in the back surface 50b. Into the recesses 501 are received the electrically conductive bodies 6 (see FIG. 1).

The body portion 50 is, for example not more than 0.5 mm in thickness, and has some degree of optical transparency, so that the optical fiber 9 received in the groove 401 is visible from the back surface 50b. This allows mounting the optical fiber 9 while checking the position of the optical fiber 9.

The pooling portion 51 is formed adjacent to the first side surface 50c of the body portion 50. The pooling portion 51 is formed in a U-shape having an opening therein on the side of the front surface 50a of the body portion 50, and comprises a bottom wall 510, and a pair of quadrangular prism shaped side walls 511 projecting from both ends, respectively, of the bottom wall MO toward the front surface 50a. A space S between the pair of side walls 511 is a pooling space which receives and pools therein an adhesive not shown until the adhesive solidifies, to fix the optical fiber 9 inserted into the groove 401 of the optical coupling member 4.

The thickness (the length in the extension direction of the optical fiber 9) of the pooling portion 51 is smaller than the length in the same direction of the body portion 50. It is, for example, not more than 20% of the length of the body portion 50.

FIGS. 8A, 8B, 8C, 8D, 8E and 8F are a top view, a front view, a side view, a back view, a bottom view and a perspective view, respectively, showing the electrically conductive bodies 6.

The electrically conductive bodies 6 integrally include first conductors 61, respectively, which are received in the recessed portions 501, respectively, formed in the second to fourth side surfaces 50d to 50f of the body portion 50, and second conductors 62, respectively, which are received in the recessed portions 501, respectively, formed in the back surface 50b. The first conductors 61 and the second conductors 62 are both shaped into a quadrangular prism, and are butted together end-to-end at right angles. In addition, the first conductors 61 are formed to be longer than the second conductors 62. In this manner, the electrically conductive bodies 6 are formed in the L-shape to be at least partially received in the recesses 501, respectively.

End faces 61a of the first conductors 61 are formed to be planar and face the electrodes 222, respectively, (see FIG. 4A) on the non-mount surface 2b of the circuit board 2. The end faces 61a are connected by the solder 7 to the electrodes 222, respectively (see FIG. 2).

Figure 9:
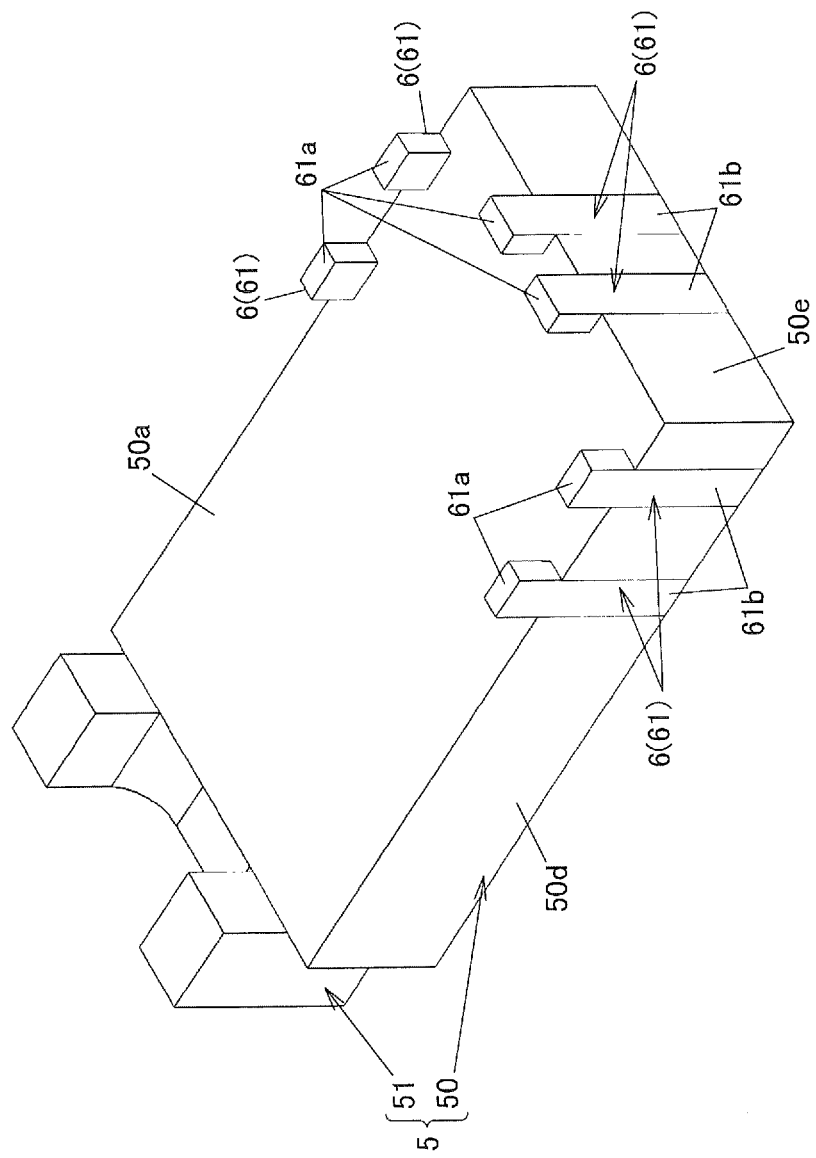
FIG. 9 is a perspective view showing the supporting member fitted with a plurality of the electrically conductive bodies.

FIG. 9 is a perspective view showing the supporting member 5 fitted with the six electrically conductive bodies 6. The electrically conductive bodies 6 are integrally fitted to the supporting member 5 by molding, for example.

The first conductors 61 are protruded toward the circuit board 2 at one end provided with the end faces 61a, relative to the front surface 50a of the supporting member 5. The one protruding end of the first conductors 61 relative to the front surface 50a serves as a positioning member to position the optical coupling member 4 and the coverlay 20 when the optical module 1 is assembled.

Side surfaces 61b of the first conductors 61 are exposed at the second to fourth side surfaces 50d to 50f of the body portion 50 of the supporting member 5. That is, when viewed from the normal direction to the second to fourth side surfaces 50d to 50f, the side surfaces 61b of the first conductors 61 are visible in the recessed portions 501, respectively. In this embodiment, the entire first conductors 61 exclusive of the projecting ends thereof relative to the front surface 50a are received in the recesses 501, respectively, and the side surfaces 61b of the first conductors 61 and the second to fourth side surfaces 50d to 50f are located on the same plane.

Figure 10:
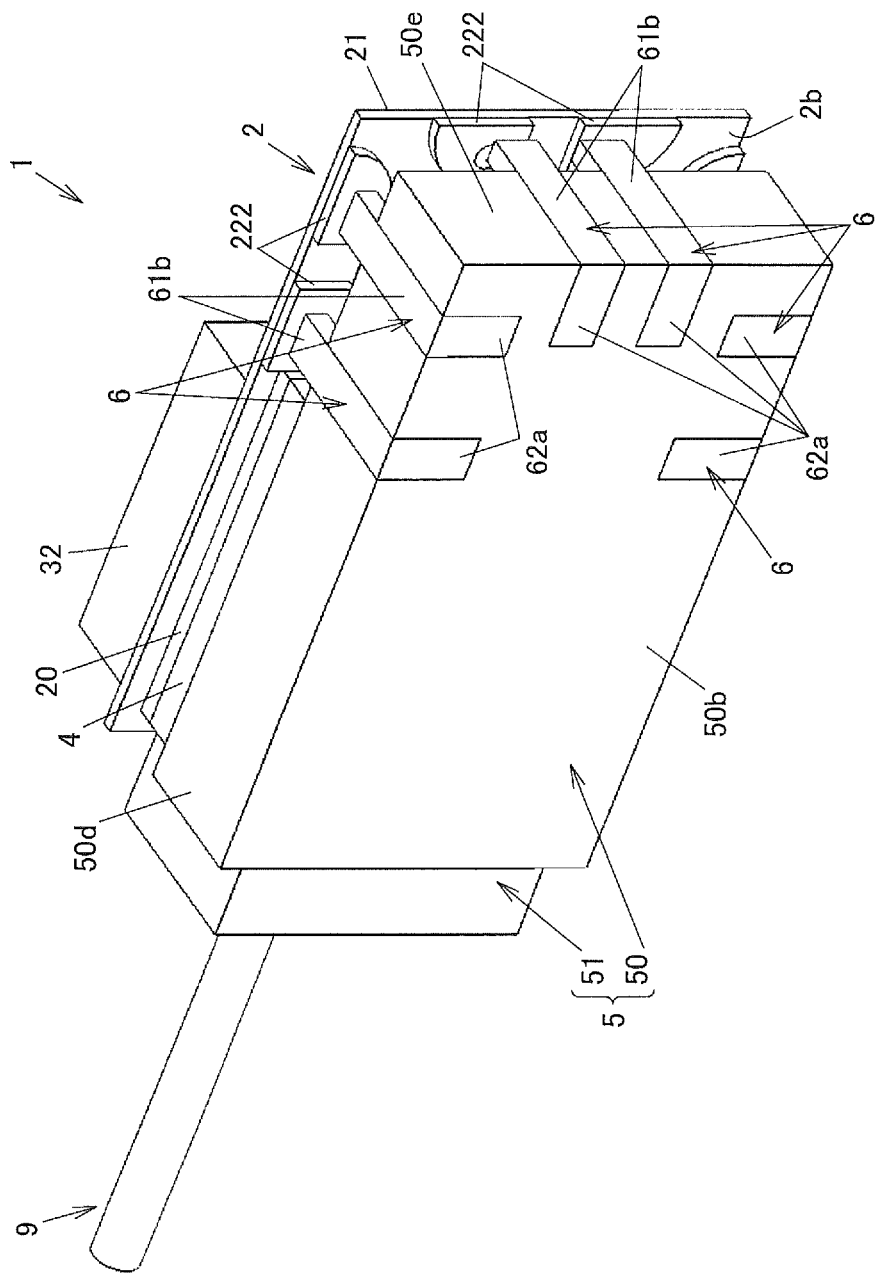
FIG. 10 is a perspective view showing the optical module viewed from a back surface of the supporting member.

FIG. 10 is a perspective view showing the optical module 1 viewed from the back surface 50b of the supporting member 5. Note that the solder 7 is not shown in FIG. 10.

The entire second conductors 62 are received in the recesses 501, respectively (see FIG. 7). Side surfaces 62a of the second electrically conductive bodies 62 are exposed at the back surface 50b of the body portion 50 of the supporting member 5. That is, when viewed from the normal direction to the back surface 50b, the side surfaces 62a of the second electrically conductive bodies 62 are visible in the recessed portions 501, respectively. In this embodiment, the side surfaces 62a of the second electrically conductive bodies 62 and the back surface 50b are located on the same plane. The side surfaces 61b of the first conductors 61 and the side surfaces 62a of the second conductors 62 of the electrically conductive bodies 6 are soldered to the copper foils 81, respectively, of the circuit board 8 (see FIG. 2).

Also, the non-mount surface 2b of the circuit board 2 has a larger area than the front surface 50a of the body portion 50 of the supporting member 5, and the electrodes 222 provided on a periphery of the non-mount surface 2b are partially sticking out (in the normal direction to the second to fourth side surfaces 50d to 50f) relative to the end faces 61a of the first conductors 61.

Figure 11:
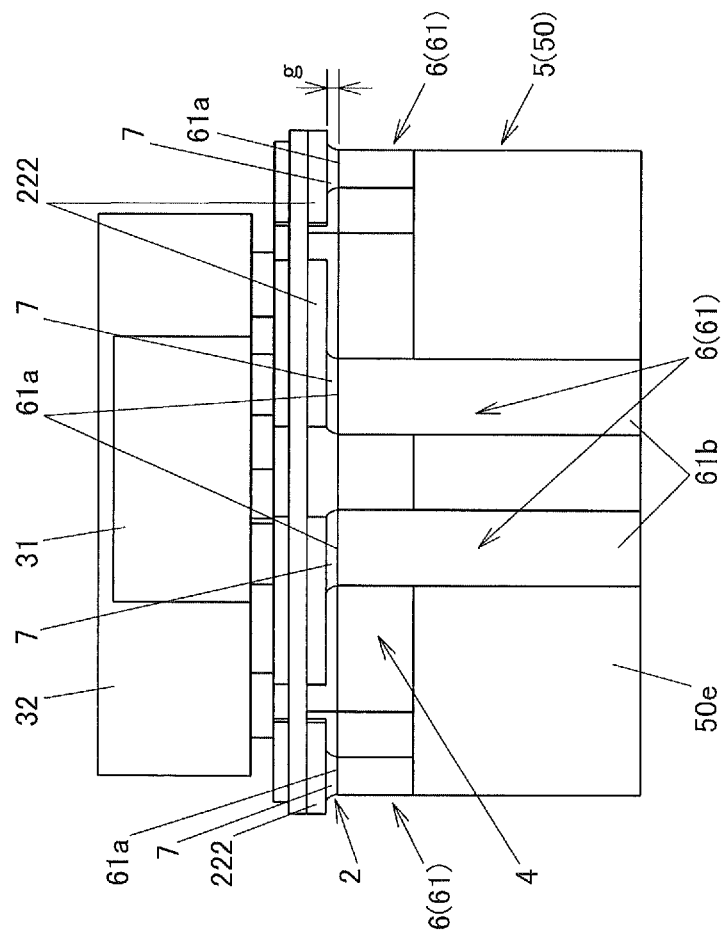
FIG. 11 is an appearance diagram showing the optical module viewed from a third side surface of a body portion of the supporting member.

FIG. 11 is an appearance diagram showing the optical module 1 viewed from the third side surface 50e of the body portion 50 of the supporting member 5.

Between the end faces 61a of the electrically conductive bodies 6 (the first conductors 61) and the electrodes 222 of the circuit board 2, there is formed a gap. The width g of this gap is 0.1 to 0.2 mm, for example. In this gap, there is placed the solder 7 heated, melted, and subsequently solidified.

(Operation of the Optical Module 1)

Next is described operation of the optical module 1 with reference to FIG. 3. Herein is mainly described the case where the photoelectric conversion element 31 is a VCSEL (Vertical Cavity Surface Emitting LASER), and the semiconductor circuit element 32 is a driver IC to drive this photoelectric conversion element 31.

The optical module 1 operates by operating power being supplied from the electronic circuit board 8. This operating power is input to the photoelectric conversion element 31 and the semiconductor circuit element 32 via the electrically conductive bodies 6 and the circuit board 2. In addition, a signal to be transmitted through the optical fiber 9 as the transmission medium is input from the electronic circuit board 8 via the electrically conductive bodies 6 and the circuit board 2 to the semiconductor circuit element 32. The semiconductor circuit element 32 drives the photoelectric conversion element 31 based on the input signal.

The photoelectric conversion element 31 emits laser light in a direction perpendicular to the mount surface 2a, from the light receiving or emitting portion formed on the opposite surface to the circuit board 2, toward the mount surface 2a of the circuit board 2. In FIG. 3, the optical path L of the laser light is indicated by a two dot chain line.

The laser light is transmitted through the base material 21 of the circuit board 2 and the coverlay 20, and enters the optical coupling member 4. The laser light having entered the optical coupling member 4 is reflected off the reflecting surface 41b, is guided to the light guiding body 41 and enters the core 90 of the optical fiber 9 from the entry or exit surface 41a.

In addition, the photoelectric conversion element 31 is a photodiode, for example. When the semiconductor circuit element 32 is a preamplifier IC, the traveling direction of the light is opposite the above described direction, and the photoelectric conversion element 31 converts the received optical signal into an electrical signal, and outputs the electrical signal to the semiconductor circuit element 32. The semiconductor circuit element 32 amplifies this electrical signal, and outputs it via the circuit board 2 and the electrically conductive bodies 6 to the electronic circuit board 8.

Functions and Advantages of the Embodiment

The present embodiment provides the following functions and advantages.

(1) The photoelectric conversion element 31 and the semiconductor circuit element 32 are mounted on the circuit board 2, and the optical fiber 9 is held in the optical coupling member 4 sandwiched between the circuit board 2 and the supporting member 5. This eliminates the need to provide a member for holding the optical fiber 9 on the upper side of the circuit board 2 (on the opposite side to the supporting member 5), and therefore allows reducing the dimension in the thickness direction of the optical module 1.

(2) Since the optical coupling member 4 is sandwiched between the circuit board 2 and the supporting member 5, the length of the groove 401 to receive the optical fiber 9 does not directly affect the entire length of the optical module 1. That is, for example when the member for holding the optical fiber and the light receiving element or the light emitting element are parallel in the extension direction of the optical fiber as in the optical module described in JP-A-2011-95295, increasing the length for holding the optical fiber leads to correspondingly increasing the entire length of the optical module, whereas in the present embodiment, since the optical coupling member 4 and the circuit board 2 are arranged in such a manner as to overlap together in the thickness direction of the optical module 1, the optical module 1 is not large sized, but the space for holding the optical fiber 9 can be ensured, thereby allowing securely holding the optical fiber 9.

(3) Since the photoelectric conversion element 31 and the semiconductor circuit element 32 are mounted on the same surface (the mount surface 2a) of the circuit board 2, it is possible to reduce the dimension in the thickness direction of the optical module 1, for example in comparison to when the photoelectric conversion element 31 is mounted on the mount surface 2a, and the semiconductor circuit element 32 is mounted on the back surface thereof (the non-mount surface 2b). In addition, the mounting of the photoelectric conversion element 31 and the semiconductor circuit element 32 is facilitated.

(4) Since the electrically conductive bodies 6 supported by the supporting member 5 are interposed between the electrodes 222 of the circuit board 2 and the copper foils 81 of the electronic circuit board 8, connection is facilitated, for example in comparison to when the electrodes 222 and the copper foils 81 are connected directly to each other by extending solder. That is, when the spacings between the electrodes 222 and the copper foils 81 are on the order of 0.5 mm, the electrodes 222 and the copper foils 81 can be connected together by solder, but interposing the electrically conductive bodies 6 therebetween allows easily and securely connecting the electrodes 222 and the copper foils 81.

(5) Since the side surfaces 61b of the electrically conductive bodies 6 are exposed at the second to fourth side surfaces 50d to 50f of the supporting member 5, solder connections thereof with the copper foils 81, respectively, of the electronic circuit board 8 are facilitated. Also, after soldering the electrically conductive bodies 6 and the copper foils 81, it is possible to visually check the connected states thereof.

(6) Since the first conductors 61 of the electrically conductive bodies 6 are protruded toward the circuit board 2 at one end provided with the end faces 61a connected to the electrodes 222 relative to the front surface 50a of the supporting member 5, the distance between the end faces 61a and the electrodes 222 is shortened, thereby making soldering easier, for example in comparison to when the electrically conductive bodies 6 do not protrude from the front surface 50a.

(7) Since the side surfaces 62a of the second conductors 62 of the electrically conductive bodies 6 are exposed at the back surface 50b of the supporting member 5, the second conductors 62 of the electrically conductive bodies 6 can more securely be soldered to the copper foils 81 of the electron circuit board 8.

(8) Since the electrically conductive bodies 6 are partially received in the recesses 501 formed in the supporting member 5, the electrically conductive bodies 6 are securely supported by the supporting member 5. In addition, since the recesses 501 and the electrically conductive bodies 6 are formed in the L-shape, the electrically conductive bodies 6 can more securely be supported by the supporting member 5, for example in comparison to when the electrically conductive bodies 6 are formed in such an I-shape as to have the first conductors 61, but not the second conductors 62.

(9) Since the optical fiber 9 is fixed to the supporting member 5 by the adhesive being pooled in the pooling portion 51 of the supporting member 5 with the tip of the optical fiber 9 received in the groove 401 of the optical coupling member 4, the optical fiber 9 can more securely be mounted to the supporting member 5.

Second Embodiment

Figure 12:
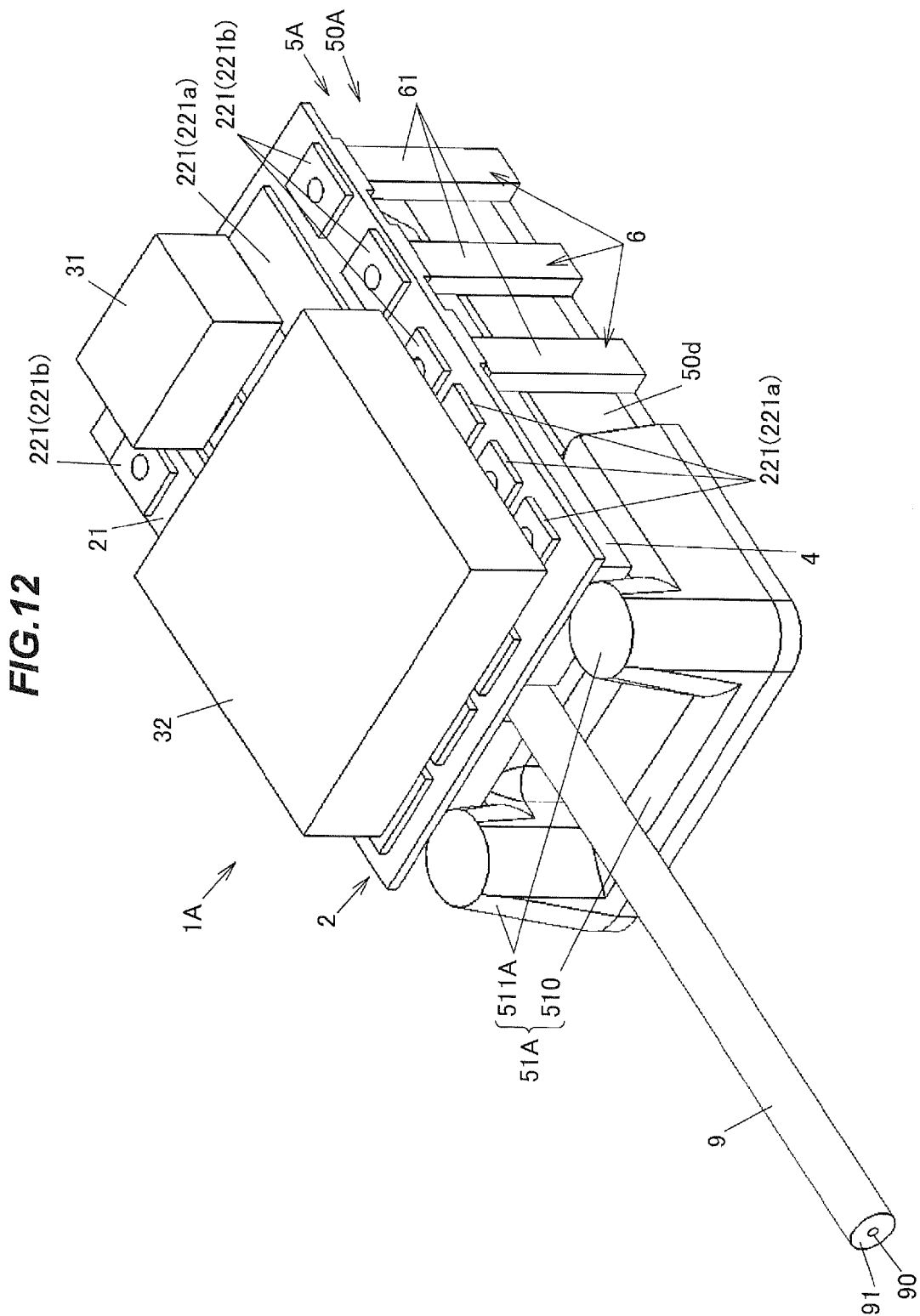
FIG. 12 is a perspective view showing an optical module in a second embodiment according to the invention.
Figure 13:
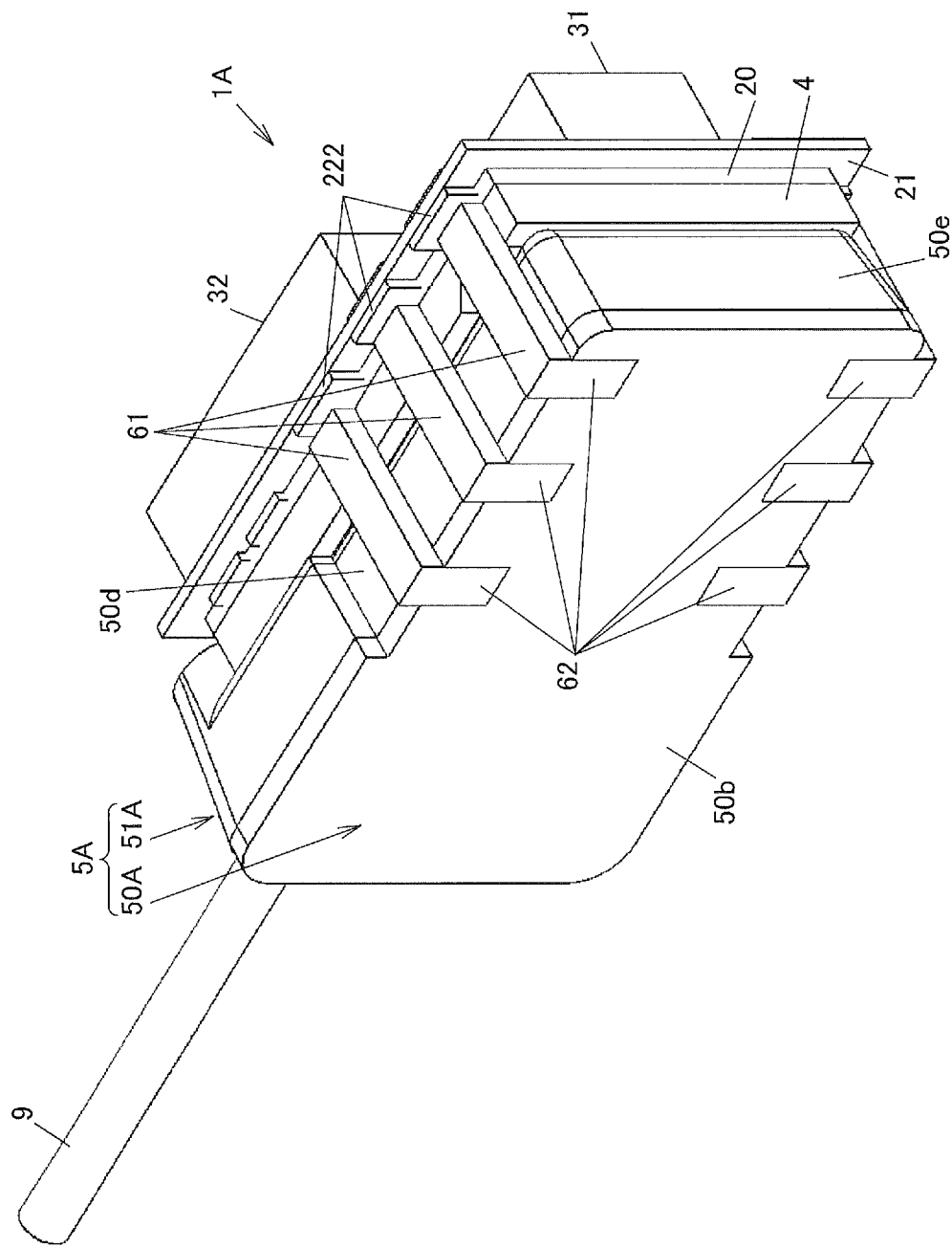
FIG. 13 is a perspective view showing the optical module in the second embodiment according to the invention.

Next is described a second embodiment of the present invention with reference to FIGS. 12 to 14. In these figures, elements having functions substantially common to those described in the first embodiment are given the same or corresponding reference numerals, and duplicated descriptions thereof are omitted.

Figure 14A:
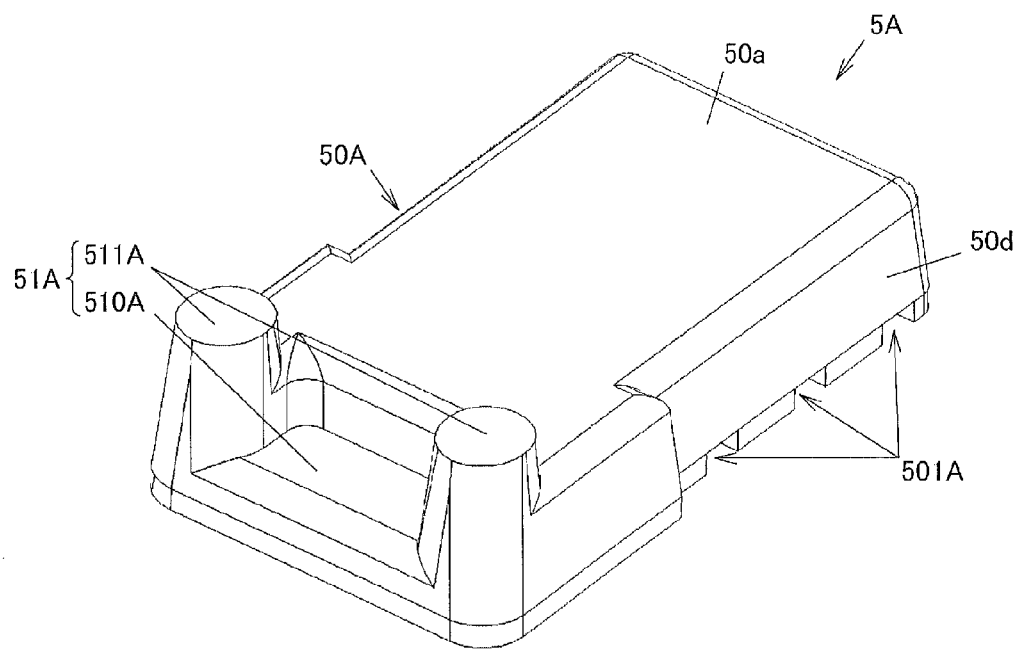
FIGS. 14A and 14B are perspective views, respectively, showing a supporting member of the optical module in the second embodiment according to the invention.
Figure 14B:
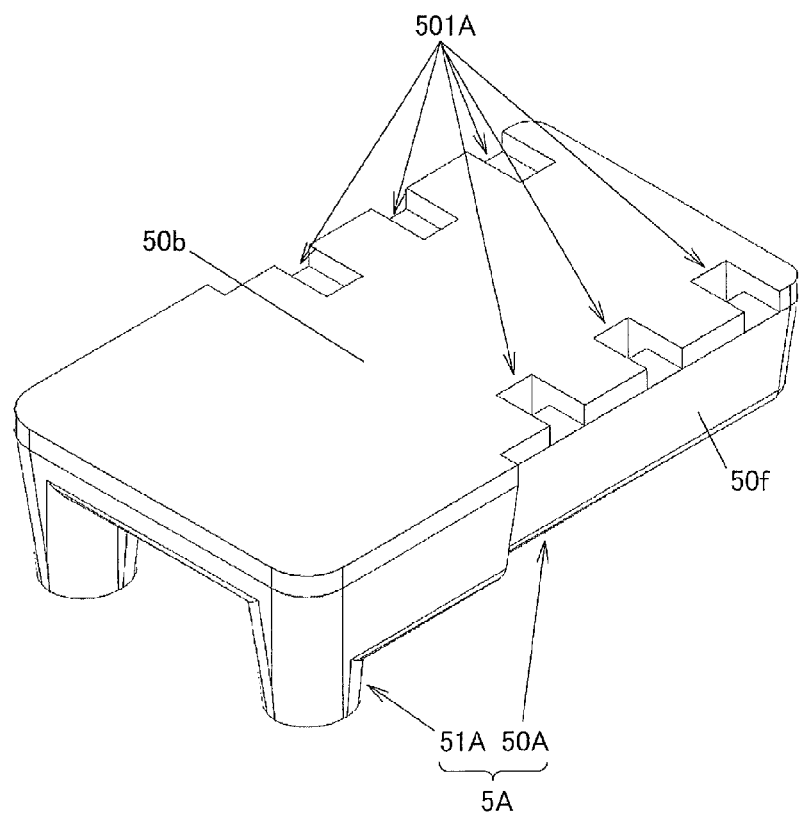

FIG. 12 is a perspective view showing an optical module 1A in this embodiment. FIG. 13 is a perspective view showing the optical module 1A viewed at a different angle from in FIG. 12. FIGS. 14A and 14B are perspective views, respectively, showing a supporting member 5A of the optical module 1A.

Whereas in the first embodiment it has been described that the pair of side walls 511 of the pooling portion 51 are shaped into the rectangular prism, a pair of walls 511A in the optical module 1A in the second embodiment are shaped into a column. The pair of walls 511A together with a bottom wall 510A constitutes a pooling portion 51A.

Further, whereas in the first embodiment the recesses 501 are each in the L-shape formed in the second to fourth side surfaces 50d to 50f and the back surface 50b, recesses 501A in the second embodiment which are formed in a body portion 50A of a supporting member 5A in the optical module 1A are formed only in the back surface 50b.

The second conductors 62 of the electrically conductive bodies 6 are received in the recesses 501A respectively, while the first conductors 61 thereof are supported and extended along the second side surface 50d and the fourth side surface 50f and in the thickness direction of the body portion 50A.

The second embodiment can provide functions and advantages similar to the functions and advantages described for the first embodiment.

Although the embodiments of the present invention have been described, the embodiments described above should not be construed to limit the claimed invention. Also, it should be noted that not all the combinations of the features described in the above embodiment are essential to the means for solving the problems of the invention.

Further, the present invention may be appropriately modified and practiced without departing from the spirit thereof. For example, although in the above embodiments it has been described that one optical fiber 9 is mounted to the optical module 1, the optical module is not limited thereto, but may be configured so as to be mounted with a plurality of the optical fibers 9.

In addition, although in the first and second embodiments, as shown in FIGS. 1 and 12, the first conductors 61 of the electrically conductive bodies 6 supported by the supporting member 5 or 5A have been shown to extend parallel to the thickness direction of the supporting member 5 or 5A, the first conductors 61 are not limited thereto, but may be extended obliquely to the thickness direction of the supporting member 5 or 5A. Further, the shape of the first conductors 61 of the electrically conductive bodies 6 is not limited to the linear shape, but may be a bent or curved shape. That is, the electrically conductive bodies 6 may at least partially be supported and extended parallel or obliquely to the thickness direction of the supporting member 5.

Further, although in the first and second embodiments it has been described that the electrically conductive bodies 6 are partially received and supported in the recesses 501 or 501A, the electrically conductive bodies 6 are not limited thereto, but may be fixed and supported to the side surfaces 50c to 50f of the supporting member 5 or 5A by, for example a bond or an adhesive. In addition, the electrically conductive bodies 6 may be pressed and supported to the side surface 50c to 50f of the supporting member 5, 5A by, for example a ring band.

In addition, although in the first and second embodiments it has been described that the electrodes 222 and the copper foils 81 of the electronic circuit board 8 are connected together by the electrically conductive bodies 6 made from a single member, the electrically conductive bodies 6 are not limited thereto, but the electrodes 222 and the copper foils 81 of the electronic circuit board 8 may be electrically connected together by the electrically conductive bodies 6 comprising a plurality of members. For example, the electrically conductive bodies 6 may be configured as a combination of first electrically conductive members which are connected to the electrodes 222, and second electrically conductive members which are separate from the first electrically conductive members and which are connected to the copper foils 81 of the electronic circuit board 8.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
   a circuit board including a mount surface and a non-mount surface opposite the mount surface;
   a photoelectric conversion element mounted on the mount surface of the circuit board;
   an optical coupling member for holding an optical fiber, the optical coupling member optically coupling the optical fiber and the photoelectric conversion element;
   a semiconductor circuit element mounted on the mount surface of the circuit board, and electrically connected to the photoelectric conversion element;
   a plate-shaped supporting member arranged so as to sandwich the optical coupling member between the supporting member and the circuit board; and
   an electrically conductive body supported by the supporting member, extended in a thickness direction of the supporting member, and connected at one end to an electrode provided on the non-mount surface of the circuit board,
   wherein the optical coupling member includes a groove therein which opens into the supporting member to receive a tip of the optical fiber, and the supporting member sandwiches the tip of the optical fiber received in the groove between the supporting member and the optical coupling member.

2. The optical module according to claim 1, wherein the supporting member includes a recess provided therein to at least partially receive the electrically conductive body.

3. The optical module according to claim 1, wherein the optical coupling member includes a holding body for holding the optical fiber, and a light guiding body for guiding light exiting from the optical fiber.

4. The optical module according to claim 1, wherein the supporting member includes a pooling portion to pool an adhesive to fix the optical fiber.

5. An optical module, comprising:
   a circuit board including a mount surface and a non-mount surface opposite the mount surface;
   a photoelectric conversion element mounted on the mount surface of the circuit board;
   an optical coupling member for holding an optical fiber, the optical coupling member optically coupling the optical fiber and the photoelectric conversion element;
   a semiconductor circuit element mounted on the mount surface of the circuit board, and electrically connected to the photoelectric conversion element;
   a plate-shaped supporting member arranged so as to sandwich the optical coupling member between the supporting member and the circuit board; and
   an electrically conductive body supported by the supporting member, extended in a thickness direction of the supporting member, and connected at one end to an electrode provided on the non-mount surface of the circuit board,
   wherein the electrically conductive body is at least partially exposed at a side surface of the supporting member.

6. The optical module according to claim 5, wherein the electrically conductive body integrally includes a first conductor at least partially exposed at the side surface of the supporting member and a second conductor provided perpendicular to the first conductor, and a side surface of the second conductor is exposed at a back surface of the supporting member opposite the optical coupling member.

7. An optical module, comprising:
   a circuit board including a mount surface and a non-mount surface opposite the mount surface;
   a photoelectric conversion element mounted on the mount surface of the circuit board;
   an optical coupling member for holding an optical fiber, the optical coupling member optically coupling the optical fiber and the photoelectric conversion element;
   a semiconductor circuit element mounted on the mount surface of the circuit board, and electrically connected to the photoelectric conversion element;
   a plate-shaped supporting member arranged so as to sandwich the optical coupling member between the supporting member and the circuit board; and
   an electrically conductive body supported by the supporting member, extended in a thickness direction of the supporting member, and connected at one end to an electrode provided on the non-mount surface of the circuit board,
   wherein the electrically conductive body protrudes at one end thereof toward the circuit board, relative to an opposite surface of the supporting member to the optical coupling member.

* * * * *